United States Patent [19]

Maric

[11] Patent Number: 5,062,443

[45] Date of Patent: Nov. 5, 1991

[54] AUTOMATIC CHANGEOVER MANIFOLD

[75] Inventor: Radovan R. Maric, Willowdale, Canada

[73] Assignee: Union Carbide Canada Limited, Toronto, Canada

[21] Appl. No.: 676,306

[22] Filed: Mar. 28, 1991

Related U.S. Application Data

[62] Division of Ser. No. 588,936, Sep. 27, 1990, Pat. No. 5,025,824.

[51] Int. Cl.[5] .............................................. F16K 11/24

[52] U.S. Cl. ................................ 137/113; 137/487.5; 137/557

[58] Field of Search ............. 137/11, 112, 113, 487.5, 137/551, 557

[56] References Cited

U.S. PATENT DOCUMENTS

| | | | |
|---|---|---|---|
| 2,402,187 | 6/1946 | Siver | 137/113 X |
| 2,547,823 | 4/1951 | Josephian . | |
| 2,714,292 | 8/1955 | Strandwitz et al. . | |
| 3,001,541 | 9/1961 | St. Clair . | |
| 3,013,573 | 12/1961 | Leuthner | 137/113 |
| 3,583,421 | 6/1971 | Treloar . | |
| 4,341,234 | 7/1982 | Meinass et al. . | |
| 4,597,406 | 7/1986 | Loiseau et al. | 137/113 |

FOREIGN PATENT DOCUMENTS

| | | | |
|---|---|---|---|
| 2441886 | 3/1976 | Fed. Rep. of Germany | 137/113 |
| 801512 | 9/1958 | United Kingdom | 137/113 |
| 1105724 | 3/1968 | United Kingdom | 137/113 |

*Primary Examiner*—Stephen M. Hepperle
*Attorney, Agent, or Firm*—Sim & McBurney

[57] ABSTRACT

An automatic changeover manifold is described which permits an uninterrupted supply of fluid, for example, cryogenic liquified gas, from a source to a fluid delivery conduit. Liquid flow is controlled by solenoid-operated on-off valves which are switched from an open-condition to a closed-condition in response to a detected low pressure condition. When flow ceases in one feed line, the solenoid-operated valve in the other feed lines opens. The electrical circuit prevents both solenoid-operated valves from being open at the same time, provided an electric current is present in the circuit.

8 Claims, 1 Drawing Sheet

AUTOMATIC CHANGEOVER MANIFOLD

This application is a division of U.S. patent application Ser. No. 588,936 filed Sept. 27, 1990, now U.S. Pat. No. 5,025,824.

FIELD OF INVENTION

The present invention relates to an automatic changeover manifold, particularly for use with cryogenic fluids.

BACKGROUND TO THE INVENTION

Automatic changeover manifolds are extensively utilized by the user of various gases where the supply is from cylinders or banks of cylinders and where the requirement is such that the flow must continue uninterrupted when one of the cylinders or banks becomes exhausted.

Examples of such operations in common usage are welding operations and breathing and anaesthetic gas flows in hospital environments. Most automatic changeover manifolds (ACM) utilize specialized changeover valves of the diaphragm type or regulators using rubberized diaphragms, set to different pressures, so that changeovers can occur and specialized 4-way valves configured to semi-automatic operation. Such conventional systems are not capable of controlling the flow of cold cryogenic liquified gas.

A search with respect to the present invention has been conducted in the facilities of the U.S. Patent and Trademark Office and the following U.S. Patents have been noted as the most relevant:

3,001,541 2,714,292
2,547,823 2,402,187
4,341,234 4,597,406
3,583,421 3,013,573

Of these references, U.S. Pat. No. 2,402,187 is considered to be the most pertinent as is discussed in detail below. None of the cited prior art describes the handling of cold cryogenic liquid gases but generally disclose systems for maintaining the uninterrupted flow of gases.

U.S. Pat. Nos. 2,547,823 and 3,001,541 specifically illustrate the use of diaphragm-controlled valves U.S. Pat. No. 2,714,292 requires a manual reset when an exhausted supply is replenished. U.S. Pat. No. 3,013,573 describes the control of flow of chemicals to a chemical stabilizing operation using "conventional pressure switches" i.e. diaphragmed switches. U.S. Pat. No. 3,583,421 describes a particular valve structure for use in a hospital anaesthetic supply system U.S. Pat. No. 4,341,234 describes an acetylene supply system which is adapted to achieve an improved gas utilization. U.S. Pat. No. 4,597,406 describes a system for delivering high purity gas at constant pressure using a particular switching control system.

U.S. Pat. No. 2,402,187, the closest known art, describes an automatic control system for four acetylene generators, arranged in two independent groups of two generators each. The electrical circuit is divided into two independent and identical circuits, so that description of the operation of one pair of the generators only is necessary.

As the supply of acetylene from one generator declines sufficiently that the pressure produced falls below a predetermined minimum value, the pressure switch associated with that flow line is activated and closes a pair of contacts, which causes an alarm to sound and a visual signal to appear on the control panel to indicate that the generator is inoperable and requires recharging. Closing of the contacts by the pressure switch also energizes one coil of a two-coil relay, which then opens normally-closed switch contacts and closes normally-open switch contacts. This activity causes the motor-driven valve associated with the first generator feed line to close and the motor-driven valve associated with the second generator feed line to open, so that the second generator comes on-stream.

The opening of the normally-closed switch contacts and the closing of the normally-open switch contacts also causes a visual indicator that the one generator is on-line to be extinguished and a visual indicator that the other generator is now on-line to be lit. The alarm is disabled by a manual reset switch. The first generator is recharged and, when the second generator becomes exhausted, the procedure is reversed.

It is evident, therefore, that the two-coil relay and associated contacts act as an interconnected control mechanism for the flow valves, constructed and arranged such that when either generation unit is on-stream, the other is cut off.

A draw-back to this prior art system, and one overcome in the present invention, is that, if both generators are inoperative at the same time, so that both pressure switches are closed, it is necessary to open manually a push button to prevent recycling of the relay. Otherwise, the circuits through the relay coils will be alternately made and broken in continuous cycles as the switch contacts are alternately opened and closed. In the present invention, in the absence of gas flow, the system assumes a stand-by mode, without the necessity for manual intervention.

SUMMARY OF INVENTION

In accordance with the present invention, there is provided an apparatus for providing a continuous supply of fluid to a fluid delivery conduit means. The apparatus includes first and second fluid supply conduit means for connecting respective first and second sources of the fluid to the fluid delivery conduit. Each of the fluid supply conduit means has pressure sensing means operatively connected thereto for sensing fluid flow pressure and solenoid-operated on-off fluid flow control valve means operatively connected thereto downstream of the pressure sensing means for controlling fluid flow therein.

The apparatus includes an electrical circuit which controls the operation of the solenoid valves to switch them on and off, so as to permit or prevent fluid flow through the respective fluid supply conduit means. With both fluid sources available, the electrical circuit only permits one of the fluid sources to provide fluid flow at one time while the electrical circuit is activated.

When one of the fluid sources delivers fluid at a pressure below a predetermined minimum value, the electrical circuit generates a signal to close the solenoid valve in the flowing fluid supply conduit and simultaneously open the solenoid valve in the other fluid supply conduit, so that fluid flow then commences through that conduit to the fluid delivery conduit means.

The exhausted fluid supply then can be replaced. When replaced, the electrical circuit recognizes that sufficient fluid pressure is now available but does not activate fluid flow until the pressure in the other fluid supply conduit falls below the predetermined minimum valve.

If the exhausted fluid supply is not replaced and the other fluid supply becomes exhausted, the electrical circuit generates an electrical signal to close the solenoid valve in the flowing fluid supply conduit, and thereby both solenoid valves are in a closed-condition. An alarm is activated to alert an operator to this condition. The system remains on stand-by until one or other of the exhausted fluid supplies is replaced, whereupon fluid flow commences from the replenished supply.

This arrangement is completely different from that described in the above-mentioned U.S. Pat. No. 2,402,187, where it is necessary to manually switch off the electrical circuit when both fluid supplies are exhausted.

DESCRIPTION OF PREFERRED EMBODIMENT

Figure 1:
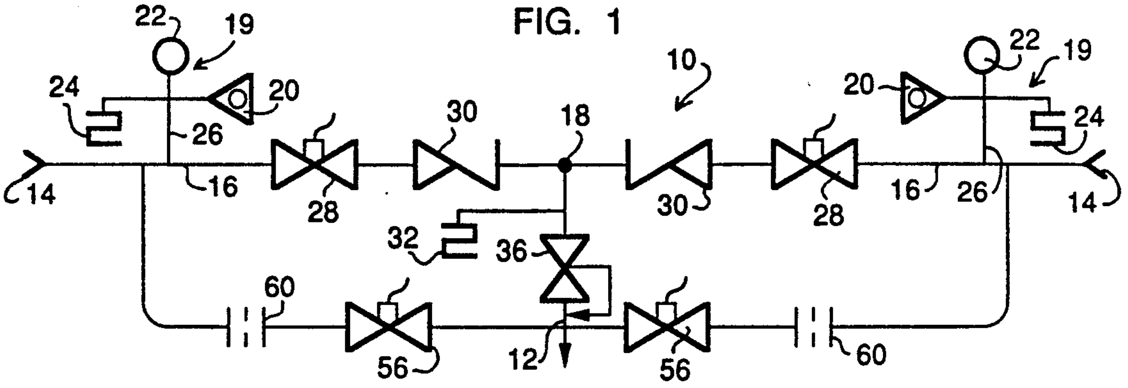
FIG. 1 is a schematic representation of an automatic changeover manifold provided in accordance with one embodiment of the invention.

Referring to the drawings, an automatic changeover manifold 10 comprises two identical halves. The illustrated device 10 is intended to ensure uninterrupted flow of fluid to a delivery conduit 12 by switching between alternate left and right hand fluid supplies, so that when one of the supplies is depleted, the other automatically comes on stream. The depleted supply can be replaced with fresh supply.

The apparatus 10 is particularly adapted for handling cryogenic liquids, such as liquid nitrogen or argon, but the principles thereof may be used to achieve a continuous supply of any convenient fluid.

For each half of fluid supply system, there is provided a port 14 connected to the supply of fluid to permit fluid to flow through a conduit 16 to the junction point 18 with the delivery conduit 12. Tapped into the conduit 16 is a cluster 19 of a pressure sensor 20, pressure indicator 22 and pressure relief valve 24. The cluster 19 may be tapped into the conduit 16 via a thin copper tubing 26, which permits cryogenic gas flowing in the conduit 16 to be warmed up to near ambient temperature, whereby the sensing and measuring devices can operate in a normal temperature environment.

Positioned downstream of the cluster 19 in the conduit 16 is a solenoid-operated valve 28, which may be normally-open or normally-closed, depending on the intended use, as discussed below, and a one-way, non-return valve 30.

Downstream from the junction point 18 in the delivery conduit 12 is positioned a pressure relief valve 32, so that pressure build-up from any cryogenic liquid trapped between closed valves can be safely relieved. The pressure relief valves 24 serve a similar function, as well as providing over-pressure protection for the gauges 22 and pressure sensors 20.

Figure 2:
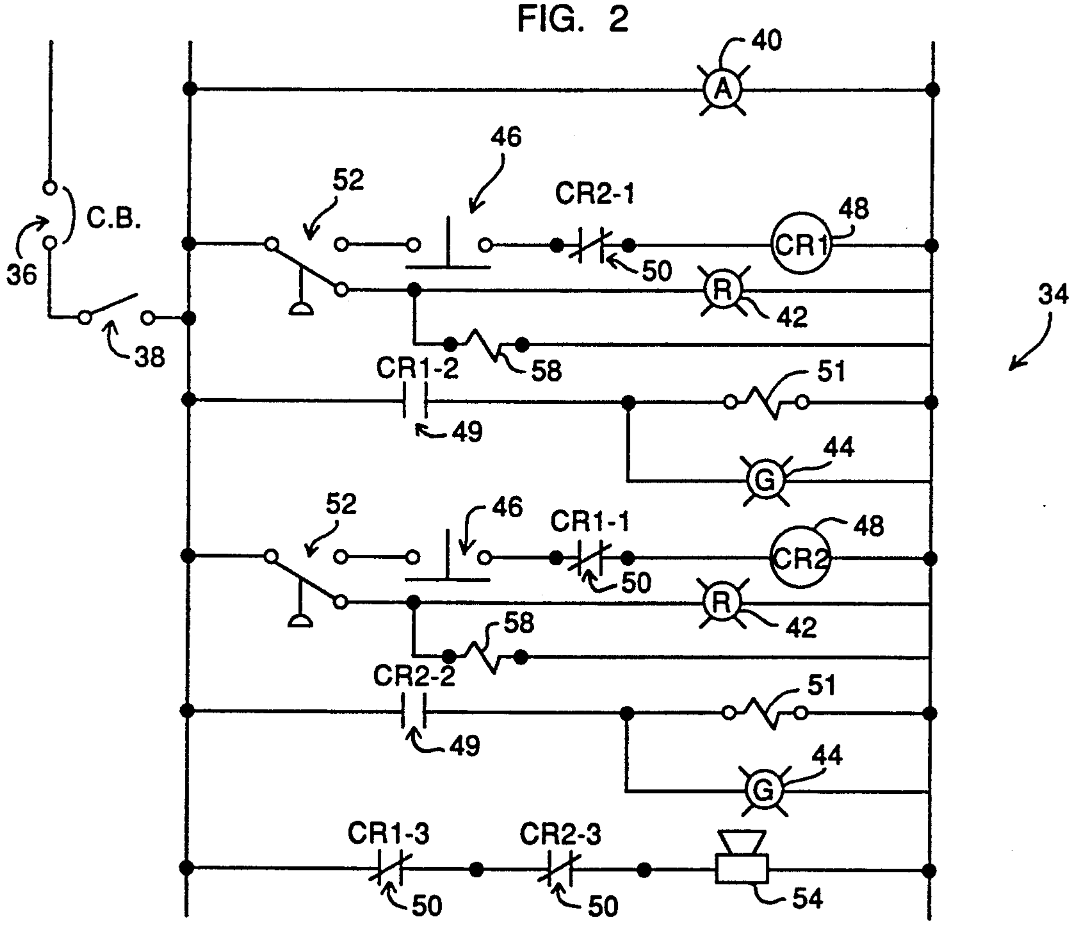
FIG. 2 is a schematic representation of the electrical control circuit for the manifold of FIG. 1.

An electrical control circuit 34 for the automatic changeover manifold 10 is shown in FIG. 2. The electrical circuit 34 is protected by a circuit breaker 36. Power to the electrical circuit 34 is provided by an ON-OFF switch 38 and a signal light 40 indicates the state of the circuit (i.e. lit if powered and not lit if not powered) When both banks of source fluid are full and the power initially turned on, the contents of the left or right bank, but not both, commence to flow to the junction point 18 and thence to the delivery conduit 12. The signal lights 40 may have any desired colour, for example, amber.

"Bank Empty" 42 lights are extinguished and the respective flowing signal light 44 is lit, indicating which of the banks is flowing. The "bank empty" lights 42 may be of any distinctive colour, such as red, and the "bank flowing" lights 44 similarly may be of any distinctive colour, such as green. "Select" momentarily-off push button switches 46 are provided to permit manual selection of the desired bank.

Control relays 48 energize or de-energize the respective solenoid control valves 28 and the respective "flowing" signal light 44, indicating which bank of fluid is flowing, through relay contacts 49 and solenoid coils 51. The control relays 48 include anti-coincidence contacts 50, so that only one bank at one time can be flowing.

An exception to the latter arrangement is when normally-open solenoid valves 28 are used, such as in hospital use, so that, upon power failure, both solenoid valves 28 open, thereby providing uninterrupted maximum available supply.

As a flowing bank becomes exhausted, its pressure drops. When the delivered pressure reaches a predetermined minimum value, the pressure sensor 20 generates an electrical signal which opens the respective switch 52, thereby de-energizing its respective control relay 48 and providing lighting power to a respective "bank empty" signal light 42.

Since the pressure switch 52 associated with the other bank already is closed, since that bank is full, opening of the circuit for the first bank and hence de-energization of the anti-coincidence contacts 50, then energizes the control relay 48 for the second bank, to open the solenoid-operated valve 28 for the other bank to permit fluid to flow from that bank to the junction point 18. The flow indicating light 44 is illuminated. At the same time, the solenoid operated valve 28 for the exhausted bank is closed.

The first bank then can be replenished, in which case, the pressure switch 52 for the first bank is again closed and the respective "bank empty" light 42 extinguished. The non-return valve (30) permits the empty bank to be removed and a full bank to replace it without any loss of fluid and without the necessity to cease operation. Flow of fluid from the replenished bank is prevented from occurring by the anti-coincidence contacts 50 until the second bank is exhausted.

If both banks become exhausted, then both pressure switches 52 are open (as illustrated in FIG. 2), and both "bank empty" lights 42 are lit. Both control relays 48 become closed, which then activates an audio alarm 54, to sound an alarm condition. When a full bank is reconnected to one of the ports 14, the appropriate pressure sensor 20 will sense the presence of fluid pressure, close the respective pressure switch 52, thereby energizing the respective control relay 48, which opens the respective solenoid-controlled valve 26, thereby recommencing fluid flow, and shuts off the alarm 54.

After the switch-over from one cylinder bank to the other occurs and the empty bank of cylinder is not immediately replaced, the empty bank of cylinders tends to warm up and rebuild sufficient pressure to extinguish the "bank empty" indicator light. To avoid this problem, a solenoid valve 56 with its coil 58 are provided in parallel with the respective bank empty light 42 so as to be activated when the empty bank is switched out of the circuits, so that the overpressure resulting from warming-up of the cylinder bank can continue to drain through a small orifice 60 and assure signal reliability.

The electrical circuit 34, therefore, uses two identical parallel circuits, each having a pressure-activated switch 52 to activate the control relay 48 for the specific solenoid-activated valve 28, with anti-coincidence relay contacts 50 being employed to ensure that only fluid from one bank flows to the delivery conduit 12 at one time, to ensure that, when the detected pressure of fluid delivered by one bank falls below a predetermined level, there is immediately commenced flow from the other bank to ensure an uninterrupted supply, and to ensure that the system assumes a stand-by mode if both banks become exhausted.

In contrast to the prior art of U.S. Pat. No. 2,402,187 discussed above, it is not necessary to shut-off the power to the control circuit 34 when both banks are empty. The arrangement of the present invention starts up immediately from the stand-by position without manual intervention when a full bank of fluid tanks is connected to a port 14. The arrangement described above, not only identifies that an exhausted bank exists, as in the cited prior art, but also which of the banks is exhausted, by employing separate "bank empty" lights 42. In addition, the system of the present invention is able to provide an uninterrupted supply in the event of power failure, for example, in a hospital environment, by employing normally-open solenoid valves 28.

SUMMARY OF DISCLOSURE

In summary of the disclosure, the present invention provides a novel automatic changeover apparatus which is useful for a wide variety of fluids, including cryogenic fluids. Modifications are possible within the scope of this invention.

What I claim is:

1. A control circuit for an automatic changeover manifold, comprising:

first pressure-activated switch means for switching electrical energy between a first electrical circuit and a second electrical circuit in parallel with said first electrical circuit, first solenoid valve control relay means in said first electrical circuit and first signal lamp means in said second electrical circuit, third electrical circuit in parallel with said first and second electrical circuits, first solenoid valve control relay contact means in said third electrical circuit and activated by said first solenoid valve control relay means, first solenoid valve coil means in said third electrical circuit and second signal lamp means in said third electrical circuit, second pressure-activated switch means for switching electrical energy between and a fourth electrical circuit and a fifth electrical circuit in parallel with said first to fourth electrical circuits, second solenoid valve control relay means in said fourth electrical circuit and third signal lamp means in said fifth electrical circuit, and sixth electrical circuit in parallel with said first to fifth electrical circuits, second solenoid valve relay contact means in said sixth electrical circuit and activated by said second solenoid valve control relay means, second solenoid valve means in sixth electrical circuit and fourth signal lamp means in said sixth electrical circuit.

2. The electrical circuit of claim 1 including first anti-coincidence relay contact means in said first electrical circuit and second anti-coincidence relay contact means in said fourth electrical circuit for preventing electrical current flow in said fourth electrical circuit when said first solenoid valve relay contact means are closed and electric current flows in said third electrical circuit and for preventing electrical current flow in said first electrical circuit when said second solenoid valve relay contact means are closed and electrical current flows in said fifth electrical circuit.

3. The electrical circuit of claim 2 including a seventh electrical circuit in parallel with said first to sixth electrical circuits and having a fifth signal lamp means therein.

4. The electrical circuit of claim 3 including audible alarm means in an eighth electrical circuit in parallel with said first to seventh electrical circuits, and third and fourth anti-coincidence relay contact means in said eighth electrical circuit for preventing current flow in said eighth electrical circuit except when electrical current flow in both said second and fifth electrical circuits.

5. The electrical circuit of claim 4 wherein each said first and fourth electrical circuits includes a momentarily-off manual switch.

6. The electrical circuit of claim 5 wherein said second and fourth signal lamps are provided in parallel to the respective solenoid valve coil means.

7. The electrical circuit of claim 1 wherein said first and third signal lamps are of the same colour, said second and fourth signal lamps are of the same colour different from that of said first and third signal lamps, and said fifth signal lamp is of a colour again different from that of the first to fourth signal lamps.

8. The electrical circuit of claim 6 wherein ninth electrical circuit means is provided in parallel with said second electrical circuit means and tenth electrical circuit means is provided in parallel with said fifth electrical circuit, and each of said ninth and tenth electrical circuit has a solenoid valve coil means therein to be activated when said second and fifth electrical circuits respectively are energized.

* * * * *